United States Patent [19]

Boie et al.

[11] Patent Number: 5,463,388

[45] Date of Patent: * Oct. 31, 1995

[54] COMPUTER MOUSE OR KEYBOARD INPUT DEVICE UTILIZING CAPACITIVE SENSORS

[75] Inventors: Robert A. Boie, Westfield; Laurence W. Ruedisueli, Berkeley Heights; Eric R. Wagner, South Plainfield, all of N.J.

[73] Assignee: AT&T IPM Corp., Coral Gables, Fla.

[*] Notice: The portion of the term of this patent subsequent to May 12, 2009, has been disclaimed.

[21] Appl. No.: 11,040

[22] Filed: Jan. 29, 1993

[51] Int. Cl.⁶ .................................................. H03K 17/94
[52] U.S. Cl. .............................................. 341/33; 345/174
[58] Field of Search ................................ 341/33; 178/18, 178/19; 345/174

[56] References Cited

U.S. PATENT DOCUMENTS

| | | | |
|---|---|---|---|
| 4,733,222 | 3/1988 | Evans | 341/33 |
| 4,737,768 | 4/1988 | Lewiner et al. | 341/33 |
| 4,772,874 | 9/1988 | Hasegawa | 341/33 |
| 4,806,709 | 2/1989 | Evans | 178/19 |
| 4,852,443 | 8/1989 | Duncan et al. | 84/1.04 |
| 4,893,071 | 1/1990 | Miller | 324/660 |
| 4,972,496 | 11/1990 | Sklarew | 178/18 X |
| 5,012,124 | 4/1991 | Hollaway | 341/33 |
| 5,016,008 | 5/1991 | Gruaz et al. | 341/33 |
| 5,113,041 | 5/1992 | Blonder et al. | 178/18 |
| 5,122,623 | 6/1992 | Zank et al. | 178/19 |

OTHER PUBLICATIONS

"The Art of Electronics," Second Edition, Horowitz and Hill, p. 889, Cambridge University Press (1989).

*Primary Examiner*—Brent Swarthout
*Assistant Examiner*—Thomas J. Mullen, Jr.
*Attorney, Agent, or Firm*—Geoffrey D. Green

[57] ABSTRACT

A computer input device for use as a computer mouse or keyboard comprises a thin, insulating surface covering an array of electrodes. Such electrodes are arranged in a grid pattern and can be connected in columns and rows. Each column and row is connected to circuitry for measuring the capacitance seen by each column and row. The position of an object, such as a finger or handheld stylus, with respect to the array is determined from the centroid of such capacitance values, which is calculated in a microcontroller. For applications in which the input device is used as a mouse, the microcontroller forwards position change information to the computer. For applications in which the input device is used as a keyboard, the microcomputer identifies a key from the position of the touching object and forwards such key identity to the computer.

10 Claims, 6 Drawing Sheets

5,463,388

COMPUTER MOUSE OR KEYBOARD INPUT DEVICE UTILIZING CAPACITIVE SENSORS

FIELD OF THE INVENTION

This invention relates to sensors for capacitively sensing the position or movement of an object, such as a finger, on a surface.

BACKGROUND OF THE INVENTION

Numerous devices are known for sensing the position of objects on surfaces, many of which relate to computer input tablets. For example, U.S. Pat. No. 5,113,041 to Greg E. Blonder et al. discloses a computer input tablet for use with a stylus in which the position of the stylus can be determined from signals transmitted to the stylus from a grid of signal lines embedded in the tablet, and U.S. Pat. No. 4,806,709 to Blair Evans discloses a touch-screen having a resistive layer with a number of point electrodes spaced thereon such that the position of a finger touching the screen can be determined from the relative values of the currents drawn from the point electrodes. The first such device requires means for the stylus itself to transmit information, such as a direct electrical connection. The second such device, and other kinds of tablets that sense the pressure of a finger or stylus, do not require such information-transmitting means.

Computer input tablets can be used for input of textual or graphical information. Various systems are known in the art which process handwritten text as if it were entered on a keyboard. Graphical information can also be captured by means of such tablets.

Other input devices such as computer "mice," joysticks and trackballs can be used with computers to control the position of a cursor on a display screen, such as a video terminal, for input of graphical information and for interactive programs such as computer games and programs using "windows" for display of information. Movement of a mouse in a particular direction on a surface causes a corresponding movement of the cursor or other object on the screen. Similarly, movement of a joystick or trackball in a particular direction causes such movement.

Input devices such as mice, joysticks and trackballs can be cumbersome because of their size and shape and, particularly with mice, the room needed for use. These drawbacks are more apparent with respect to portable computers, such as the so-called "notebook" computers. It is deskable, therefore, to furnish such control capabilities in an input device that can be incorporated in a small space, but without sacrificing ease of use. It is also desirable to be able to use such a device for multiple functions, for example, a particular area of a computer keyboard that can also be used as a mouse without losing its functionality as a keyboard. Further, it is desirable that such an input device be capable of operation by a finger or handheld stylus that does not require an electrical connection or other means for transmitting information.

SUMMARY OF THE INVENTION

The capacitive sensor of the invention comprises a thin, insulating surface covering a plurality of electrodes. The position of an object, such as a finger or hand-held stylus, with respect to the electrodes, is determined from the centroid of capacitance values measured at the electrodes. The electrodes can be arranged in one or two dimensions. In a two-dimensional array, the capacitance for each electrode can be measured separately or the electrodes can be divided into separate elements connected in columns and rows and the capacitances measured for each column and row. The x and y coordinates of the centroid are calculated in a microcontroller from the measured capacitances. For applications in which the sensor is used to emulate a mouse or trackball, the microcontroller forwards position change information to utilizing means. For applications in which the sensor is used to emulate a keyboard, the microcontroller identifies a key from the position of the touching object and forwards such key identification to utilizing means.

These and other aspects of the invention will become apparent from the attached drawings and detailed description.

DETAILED DESCRIPTION

The invention will be described in terms of a exemplary two-dimensional embodiment adapted to emulate a computer mouse or keyboard for use with a personal computer. However, it will be clear to those skilled in the art that the principles of the invention can be utilized in other applications in which it is convenient to sense position of an object capacitively in one or more dimensions.

Figure 1:
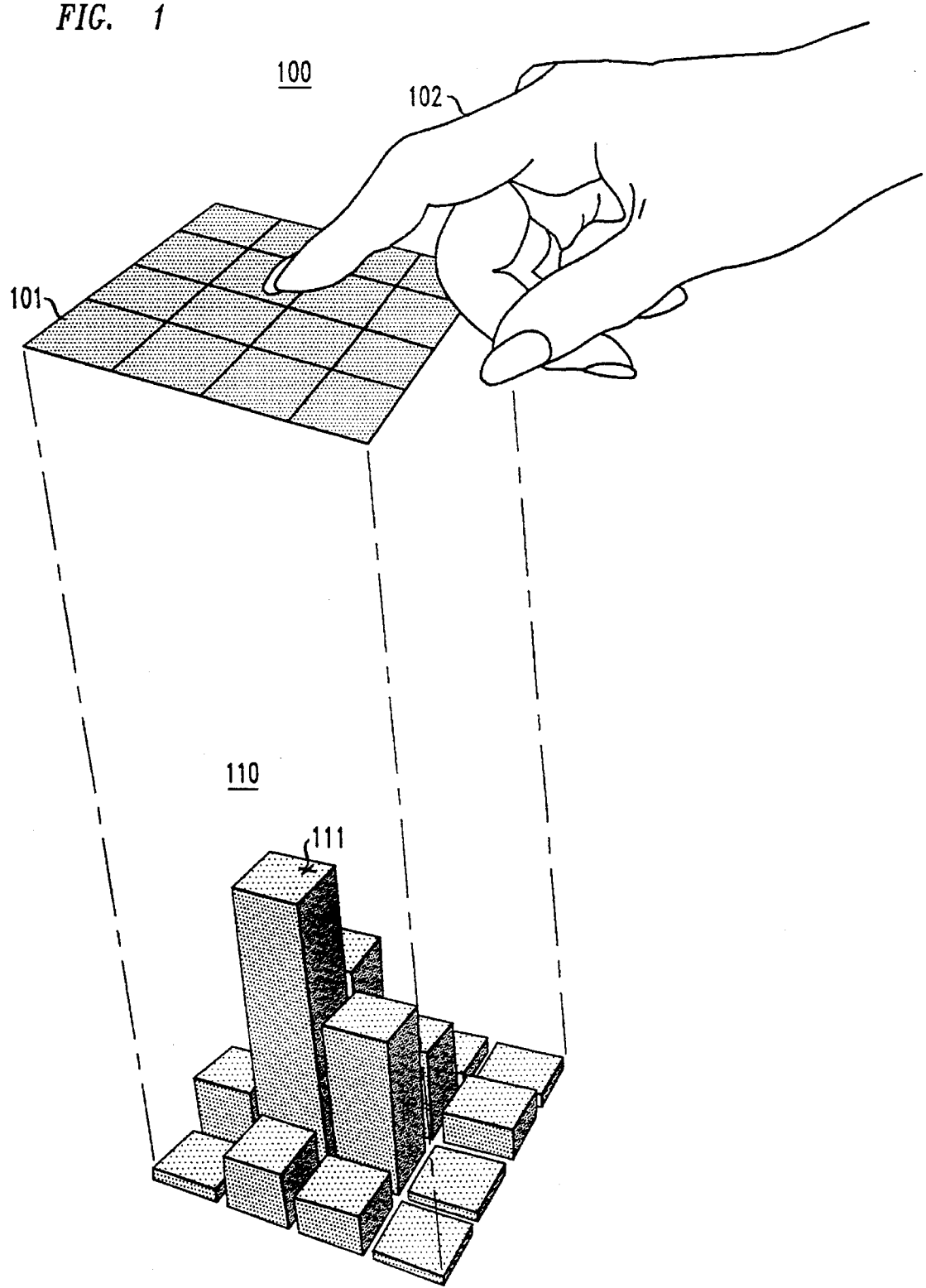
FIG. 1 is a graphic diagram showing the relationship between the position of a user's finger and capacitances at electrodes in a two- dimensional sensor constructed in accordance with the invention.

The operational principle of the capacitive position sensor of the invention is shown in FIG. 1. Electrode array 100 is a square or rectangular array of electrodes 101 arranged in a grid pattern of rows and columns, as in an array of tiles. A 4×4 array is shown, which we have found adequate for emulating a computer mouse by finger strokes on the array. However, the invention can be used with arrays of other sizes, if desired. The electrodes are covered with a thin layer of insulating material (not shown). Finger 102 is shown positioned with respect to array 100. Electrode array 100 can be one- dimensional for applications in which position in only one dimension is to be sensed.

Histogram 110 shows the capacitances for electrodes 101 in array 100 with respect to finger 102. Such capacitances are a two- dimensional sampling of the distribution of capacitance between array 100 and finger 102. The centroid (center of gravity or first moment) 111 of such distribution will correspond to the position of finger 102, or some other object touching array 100, if suitable sampling criteria are met; that is, by choosing electrodes of sufficiently small size when compared to the extent of the distribution. Such criteria are discussed in the Blonder et al. patent referred to above.

The x and y coordinates of the centroid can be determined by directly measuring the capacitance at each electrode 101 and calculating such x and y coordinates from such measured capacitances. Thus, for the 4×4 array 100, sixteen capacitance measurements would be needed. The number of measurements can be reduced, however, by taking advantage of the fact that the one-dimensional centroids of the projections of the distribution onto the x and y axes also correspond to the finger position. Such projections can be formed by subdividing each electrode 101 into two elements, as shown in FIG. 2.

Figure 2:
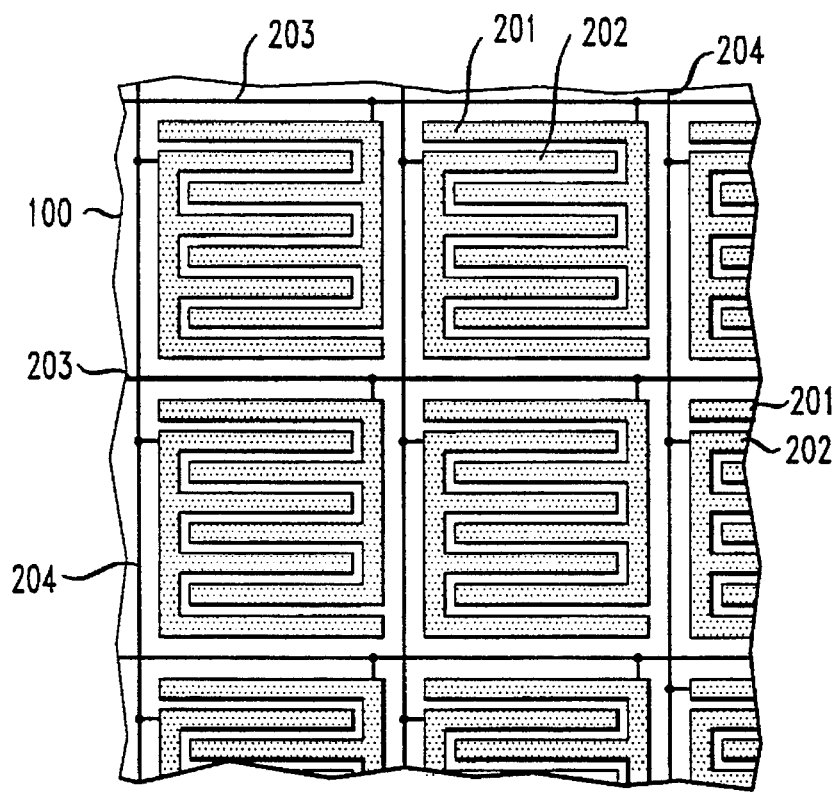
FIG. 2 is a more detailed representation of interdigitated electrode components at the intersections of rows and columns in a two-dimensional sensor.

FIG. 2 shows four such subdivided electrodes in more detail at an intersection of two rows and two columns in array 100. As can be seen from FIG. 2, a horizontal element 201 and a vertical element 202 are situated at each intersection of a row and column. Horizontal elements 201 are interconnected by leads 203 and vertical elements 202 are interconnected by leads 204. Elements 201 and 202 can be interdigitated as shown. It is advantageous for the conducting areas of elements 201 and 202 to cover the surface of array 100 as completely as possible. For finger strokes, we have used interdigitated elements 201 and 202 that are approximately 0.37" square. Smaller electrodes 101 or elements 201 and 202 be desirable for use with a hand-held stylus having a smaller cross-section than a finger.

As will be clear to those skilled in the art, elements 201 and 202 can be fabricated in one plane of a multi-layer printed circuit board together with one set of interconnections, for example, the horizontal row connections 203. The vertical row connections 204 can then be fabricated in another plane of the circuit board with appropriate via connections between the planes.

Figure 3:
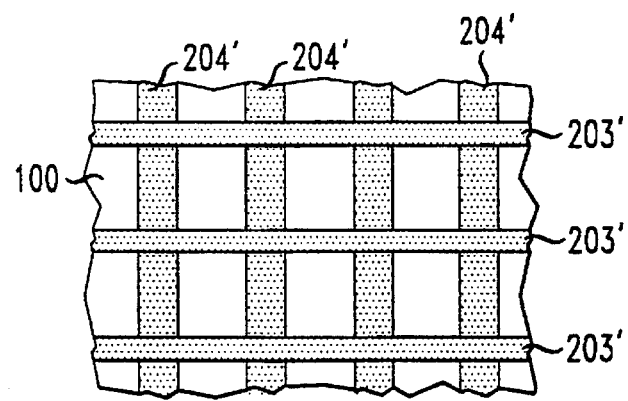
FIG. 3 is an alternate arrangement for electrodes in the array.

Other electrode array configurations can be used, if desired. For example, FIG. 3 shows horizontal strip electrodes 203' overlapping vertical strip electrodes 204'. Electrodes 203' and 204' are separated by a thin insulating layer (not shown) and covered by another thin insulating layer (not shown). In such a configuration, areas of electrodes 204' must be left unmasked by electrodes 203' so that electrodes 204' can still "see" the capacitance of an object touching the surface in which such electrodes are embedded. A similar configuration of electrodes is shown in the Blonder et at. patent. However, the structure of FIG. 2 is preferred because the interdigitated elements 201 and 202 do not overlap and the capacitance values measured can be higher for a given area of array 100, thus providing greater noise immunity.

Figure 4:
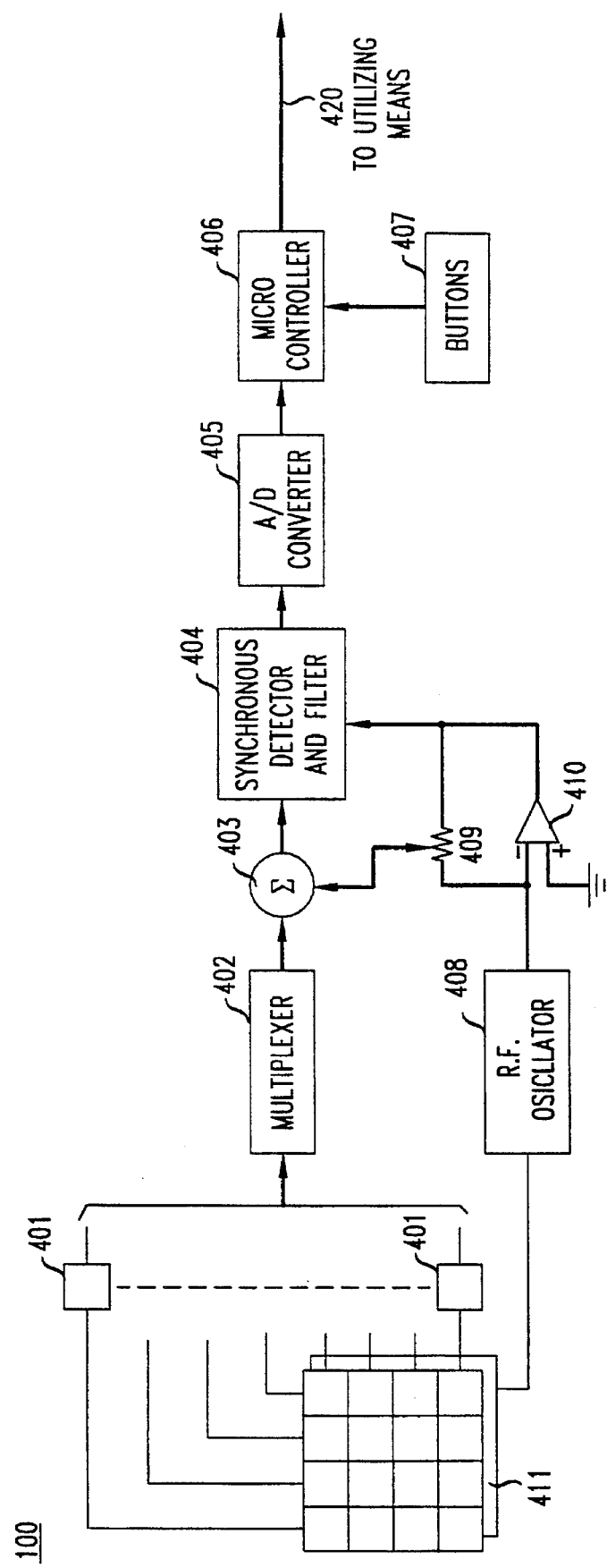
FIG. 4 is an overall block diagram of a two-dimensional capacitive position sensor in accordance with the invention.

FIG. 4 is an overall block diagram of a capacitive sensor 400 in accordance with the invention. Electrode array 100 comprises rows and columns of electrodes, for example, rows and columns of connected horizontal and vertical elements as shown in FIG. 2. Referring again to FIG. 4, each row and column of electrodes from array 100 is connected to an integrating amplifier and bootstrap circuit 401, which is shown in more detail in FIG. 5 and will be described below. Each of the outputs from circuits 401 can be selected by multiplexer 402 under control of microcontroller 406. The selected output is then forwarded to summing circuit 403, where such output is combined with a signal from trimmer resistor 409. Synchronous detector and filter 404 convert the output from summing circuit 403 to a signal related to the capacitance of the row or column selected by multiplexer 402. RF oscillator 408 provides an RF signal, for example, 100 kilohertz, to circuits 401, synchronous detector and filter 404 via inverter 410, and guard plane 411. Guard plane 411 is a substantially continuous plane parallel to array 100 and associated connections, and serves to isolate array 100 from extraneous signals. The operation of synchronous detector and filter 404 is well known in the art, for example, see page 889 of "The Art of Electronics," Second Edition, by Horowitz and Hill, Cambridge University Press (1989). A capacitive proximity detector having a single electrode, a guard plane and similar circuitry is disclosed in co-pending Application No. 07/861,667 for R. A. Boie et al. filed Apr. 1, 1992, now U.S. Pat. No. 5,337,353.

Apparatus similar to that shown in FIG. 4 can also be used for applications in which it is desired to measure separate capacitance values for each electrode in array 100 instead of the collective capacitances of subdivided electrode elements connected in rows and columns. To measure such capacitances separately, a circuit 401 is provided for each electrode in array 100 and multiplexer 402 is enlarged to accommodate the outputs from all circuits 401.

The output of synchronous detector and filter 404 is converted to digital form by analog-to-digital converter 405 and forwarded to microcontroller 406. Thus, microcontroller 406 can obtain a digital value representing the capacitance seen by any row or column of electrode elements (or electrode if measured separately) selected by multiplexer 402. Buttons 407, which can be auxiliary pushbuttons or switches situated near array 400, are also connected to microcontroller 406. Buttons 407 can be used, for example, for the same purposes as the buttons on a computer mouse. Microcontroller 406 sends data to utilizing means, such as a personal computer (not shown) over lead 420. A particular device that can be used for A/D converter 405 and microcontroller 406 is the 87C552 circuit made by Intel Corporation, which includes both an A/D converter and a microprocessor.

Figure 5:
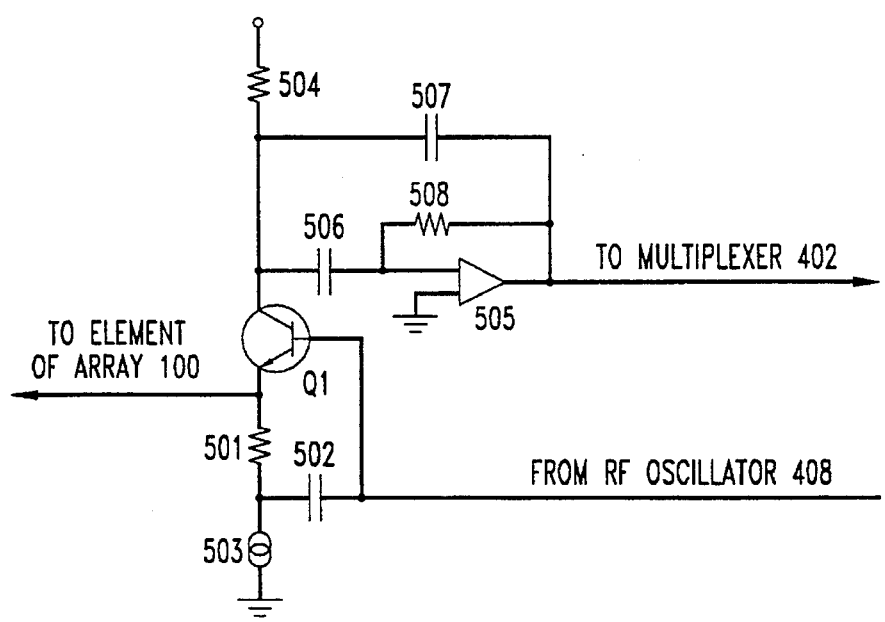
FIG. 5 is a diagram of an integrating amplifier and bootstrap circuit associated with the electrodes.

FIG. 5 is a circuit diagram of each integrating amplifier and bootstrap circuit 401. The RF signal from RF oscillator 408 drives the base of transistor Q1 and the bootstrap circuit comprised of resistor 501 and capacitor 502. Current source 503 provides a constant DC bias current through transistor Q1. An electrode in array 100 is connected to the emitter of transistor Q1. The RF current to an electrode is determined by the capacitance seen by the electrode; thus, an increase in capacitance caused by the proximity of an object, such as a finger, causes in increase in such current. Such an increase is reflected as a change in the RF current flowing from the collector of transistor Q1. The collector of transistor Q1 is connected to the input node of integrating amplifier 505 via coupling capacitor 506. For a change in capacitance, ←C, at the electrode, the change in the amplitude of the output signal from amplifier 505 will be approximately $A(\Delta C/C_f)$, where A is the amplitude of the RF signal from oscillator 408 and $C_f$ is the value of integrating capacitor 507. Resistor 508 provides a bias current for amplifier 505 and resistor 504 provides bias current for transistor Q1.

The effects of electrode-to-electrode capacitances, wiring capacitances and other extraneous capacitances are minimized by driving all electrodes and guard plane 411 in unison with the same RF signal from RF oscillator 408. The bootstrap circuit serves to minimize any signal due to the finite impedance of the biasing circuit of transistor Q1. The base-to-collector capacitance of transistors Q1 and other stray capacitances in the circuit can be compensated for by adjusting trim resistor 109 shown in FIG. 1.

Figure 6:
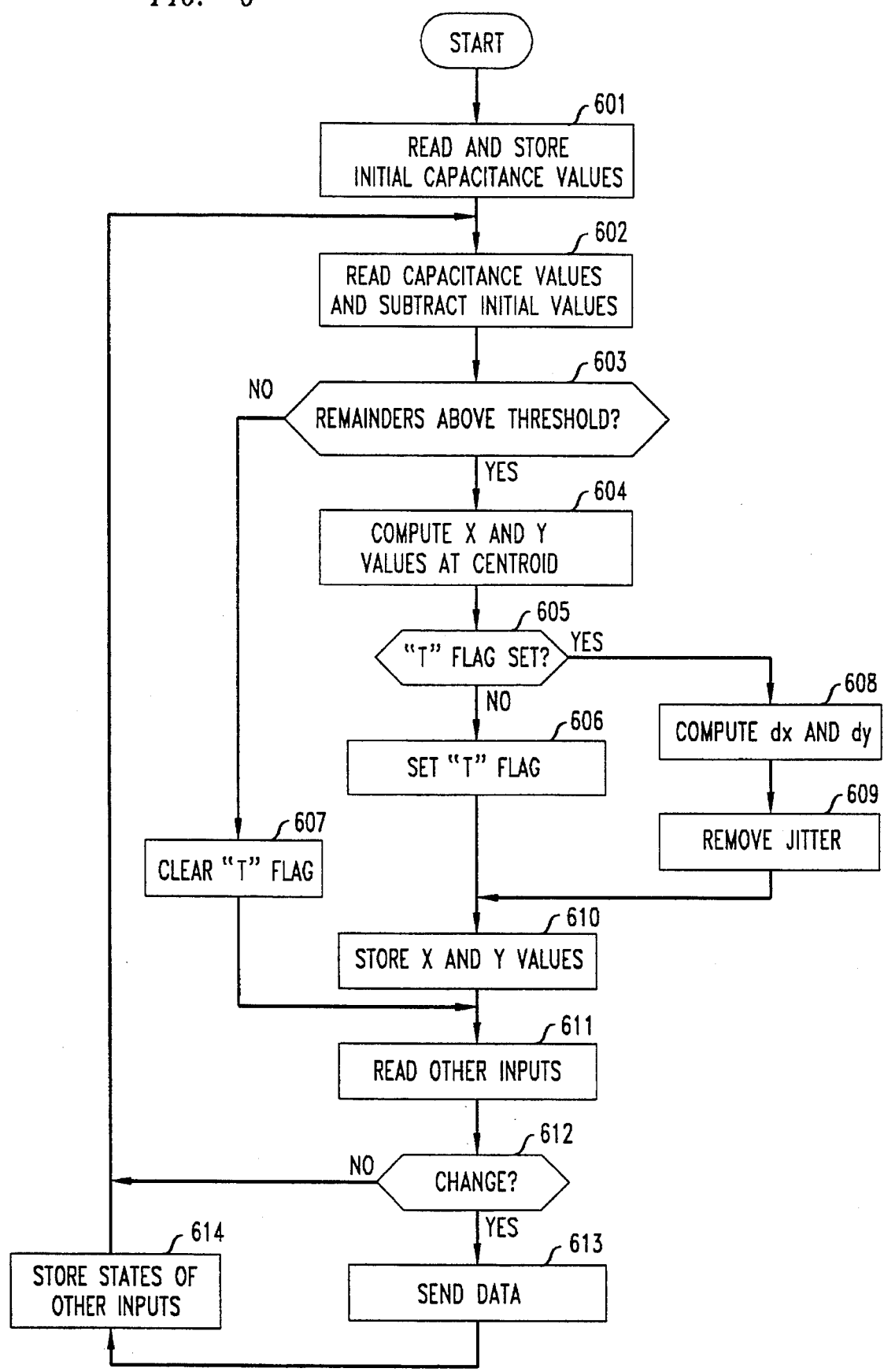
FIG. 6 is a flow chart showing operation of the capacitive position sensor of the invention as a computer mouse or trackball.

In using the position sensor of the invention as a computer mouse or trackball to control a cursor, movement of the mouse or trackball is emulated by touching array 100 with finger 102, or some other object, and stroking finger 102 over array 100 to move the cursor. Changes in position of the finger with respect to array 100 are reflected in corresponding changes in position of the cursor. Thus, for such an application, microcontroller 406 sends data over lead 420 relating to changes in position. FIG. 6 is a flow chart of the operation of microcontroller 406 in such an application.

Referring to FIG. 6, microcomputer 406 reads the initial capacitance values for all the elements in array 100 and stores such values (step 601). Such initial values should reflect the state of array 100 without a finger or other object being nearby, accordingly, it may be desirable to repeat step 601 a number of times and then to select the minimum capacitance values read as the initial values, thereby compensating for the effect of any objects moving close to array 100 during the initialization step. After initialization, all capacitance values are periodically read and the initial values subtracted to yield a remainder value for each element (step 602). If one or more of the remainders exceeds a preset threshold (step 603), indicating that an object is close to or touching array 100, then the x and y coordinates of the centroid of capacitance for such object can be calculated from such remainders (step 604). For applications in which the electrodes of array 100 are connected in rows and columns, as shown in FIG. 2 and FIG. 3, such calculation can be performed as follows:

$$x = \frac{\sum_{n_x=1}^{u_x} n_x V(n_x)}{\sum_{n_x=1}^{u_x} V(n_x)} \quad (1)$$

$$y = \frac{\sum_{n_y=1}^{u_y} n_y V(n_y)}{\sum_{n_y=1}^{u_y} V(n_y)} \quad (2)$$

where:

$u_x$ is the number of columns, $V(n_x)$ is the remainder value for column $n_x$, $u_y$ is the number of rows and $V(n_y)$ is the remainder value for row $n_y$. To avoid spurious operation, it may be desirable to require that two or more measurements exceed the preset threshold. The threshold can be set to some percentage of the range of A/D converter 405, for example 10–15% of such range. Note that the value of x can neither be less than 1 nor more than $u_x$ and the value of y can neither be less than 1 nor more than $u_y$.

For applications in which the capacitance values for the electrode 101 in array 100 are measured separately, the x and y values of the centroid can also be calculated using equations (1) and (2) by adding all the capacitances measured for a row or column to obtain the value of V for such row or column. Such addition has the same effect as if the electrodes were connected together in a row or column.

When set, the "T" flag indicates that remainders were above the threshold during the previous iteration through step 603. Such flag is set during step 606 and cleared during step 607. Thus, after the first iteration through step 603, indicating a new stroke of finger 102 on array 100, the "T" flag is set and the x and y values just calculated are stored. During each subsequent iteration during such stroke, the changes in x and y (dx and dy) are calculated (step 608) as follows:

$$dx = x_c - x_p \quad (3)$$

$$dy = y_c - y_p \quad (4)$$

where $x_c$ and $y_c$ are the values just calculated in step 605 and $x_p$ and $y_p$ are the values calculated and stored (step 610) during the previous iteration.

It may be desirable to remove jitter from the least-significant bit in the values of dx and dy calculated (step 609). This can be accomplished by incrementing negative values by 1 and decrementing positive values by 1, leaving zero values without change.

The values calculated for x and y are stored (step 610) for use in calculating dx and dy during the next iteration. Then, if other inputs, such as buttons 407, are connected to microcontroller 406, the state of such inputs is read (step 611). Finally, if x and y have changed (dx≠0 or dy≠0) or the state of buttons 407 has changed (step 612), data relating to such changes is sent over line 420 to the computer or other utilizing means to which sensor 400 is connected (step 613). Such data typically includes dx, dy and the current state of the buttons, which corresponds to that sent to a computer by a conventional computer mouse or trackball. Finally the states of such other inputs are stored (step 614) for use during the next iteration.

Typically the cycle time through the above-described steps will be about 20 milliseconds, depending on the time constant of the filter in circuit 404. After each change of multiplexer 402, microcontroller 406 is programmed to wait approximately 2 milliseconds for the output of circuit 404 to settle.

It will be clear that the absolute values of x and y can be included in the data sent over line 420 to utilizing means, if desired. For example, capacitive input sensor 400 can be adapted for use as a general purpose input pad for entering handwritten information. For such an application, it may be deskable to increase the number of electrodes to improve definition, but even a 4×4 matrix for use with finger input can produce useful input data because of the interpolating effect of the centroid-finding calculations performed in step 604.

Instead of using buttons 407 for additional input when array sensor 100 is used as a computer mouse, it may be desirable to sense different finger pressures. For example, to perform a "click and drag" operation, a typical use of a computer mouse, a heavier finger pressure can be used on array 100 than when an ordinary cursor movement is desired. Clearly finger pressures can be sensed by electromechanical or other means, but differences in the capacitances sensed by sensor 400 can also be used for this purpose.

The magnitudes of the capacitance values sensed by array 100 are somewhat related to finger pressure because of the compressibility of the fingertip when contacting array 100. Higher finger pressure will cause higher capacitance values to be sensed. This effect can be enhanced by replacing the insulating layer (not shown) on array 100 with a compressible insulating layer. Different finger pressures can be set by defining one or more additional thresholds for use in step 603. An ordinary touch would cause the remainders to exceed only the first threshold; a heavier touch would cause at least one remainder to exceed a higher threshold, which could then be used to indicate a different button state.

Figure 7:
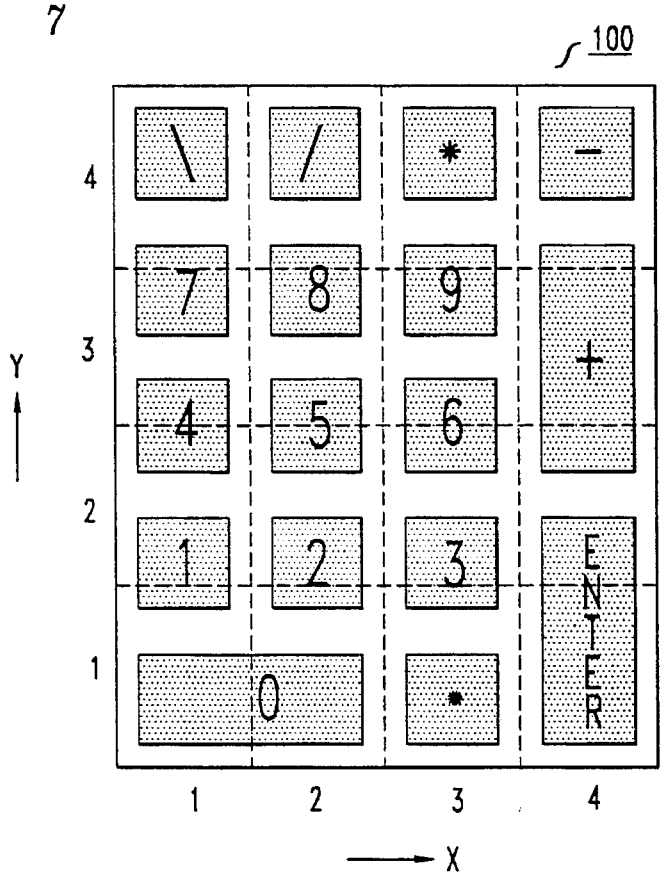
FIG. 7 is a diagram showing use of the capacitive position sensor of the invention as a keyboard.

FIG. 7 is a diagram showing how an array 100 can be used as a keyboard in accordance with the invention. Again, array 100 is shown as a 4×4 matrix of electrodes, but with a keyboard pattern overlay superimposed on the matrix. The dotted lines indicate such matrix. Such a keyboard pattern can be printed on the insulating layer covering the electrodes. Note that the individual "keys" in the keyboard do not necessarily correspond to the underlying electrodes. The x and y coordinates are shown for reference purposes. Since the values obtained for x and y in a 4×4 matrix using equations (1) and (2) will range from 1 to 4, this range is shown on the coordinates.

The identity of a key touched is determined from the x and y values computed for the centroid of capacitance resulting from the touch. For example, using the x and y coordinates shown in FIG. 7, a "5" can be defined as a touch with $[1.7 \leq x \leq 2.3, 2.3 \leq y \leq 2.7]$; a "0" can be defined as a touch with $[1 \leq x \leq 2.3, 1 \leq y \leq 1.3]$; and a "+" can be defined as a touch with $[3.7 \leq x \leq 4, 2.4 \leq y \leq 3.5]$. These ranges are chosen to leave guard bands between adjacent keys. Such a range for each key on the keyboard is stored in microprocessor 406.

Figure 8:
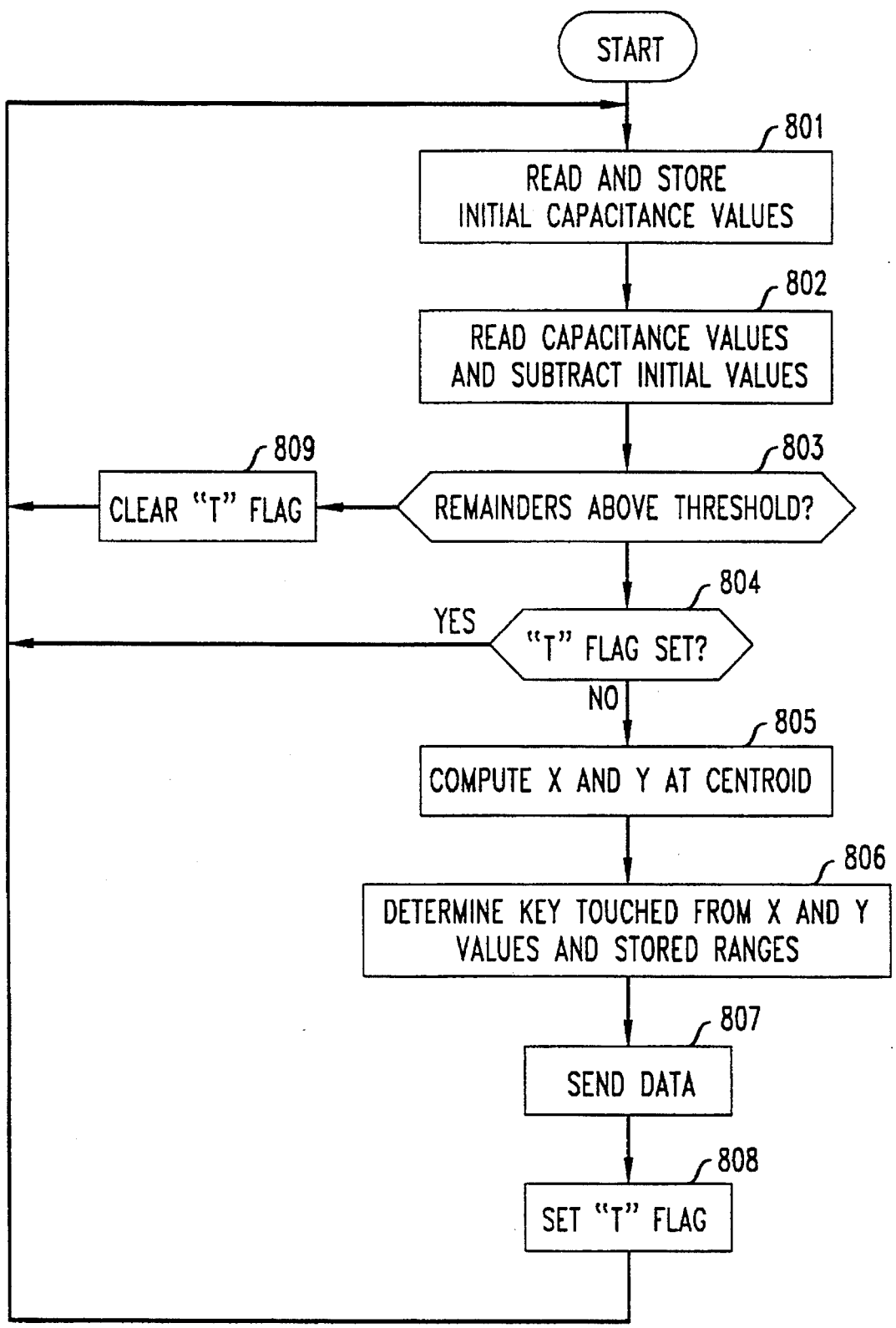
FIG. 8 is a flow chart showing operation of the capacitive position sensor of the invention as a keyboard.

FIG. 8 is a flow chart showing operation of microcontroller 406 when the capacitive position sensor of the invention is used as a keyboard. Steps 801, 802, 803 and 805 are similar to steps 601, 602, 603 and 604, respectively, in FIG. 6. In step 805, the identity of the key touched is determined from the stored ranges and the values of x and y calculated in step 806. In step 807, the identity of the key touched is sent to utilizing means. The "T" flag is set in step 808, cleared in step 809 and tested in step 804. Such flag assures that the key identity is sent to utilizing means only once.

It should be clear that the various ways described above of using the capacitive position sensor of the invention can be combined. For example, a combination mouse-keyboard can be implemented in which one portion of array 100 is used as a mouse responsive to finger strokes and a second portion is used as a keyboard responsive to finger touches. Alternatively, array 100 can be adapted to operate in different modes: the first mode as a mouse, the second as a keyboard. Switching between modes can be accomplished, for example, with one of buttons 407, or with extra pressure in a specified region of array 100. Thus, where space is at a premium, such as in a portable computer, the capacitive position sensor of the invention can be used as part of the keyboard and also as a mouse.

The invention has been shown and described with reference to particular embodiments. However, it will be understood by those skilled in the art that various changes may be made therein without departing from the spirit and scope of the invention.

What is claimed is:

1. A sensor for capacitively sensing the position in a continuous range of positions of an object on a surface of an input device, which comprises:

an array of electrodes on said surface;

an insulating layer covering said electrodes;

means connected to said electrodes for measuring a capacitance value for each said electrode;

means responsive to said measuring means for comparing said capacitance values with a first preset threshold and, if at least one of said capacitance values exceeds said first preset threshold, for calculating the position of a centroid of capacitance for said array from said measured capacitance values, said first preset threshold being set at a capacitance value that is exceeded for a given electrode only when said object is close to or touching said given electrode, said centroid of capacitance being the first moment of the distribution of said capacitance values in said array and representing substantially the position of said object on said surface; and means responsive to said calculating means and connected to utilizing means for sending said centroid of capacitance position to said utilizing means.

2. The sensor of claim 1 in which said array is a two-dimensional array and said electrodes are arranged in rows and columns.

3. The sensor of claim 2 wherein said input device is a keyboard, said sensor further comprising:

means for designating portions of the surface of said keyboard to represent different keys; and said calculating means comprises:

means for storing a range of coordinates for each key in said keyboard;

means for comparing said centroid of capacitance position with said ranges of coordinates and selecting the range of coordinates in which said centroid of capacitance position falls, and said sending means comprises means for sending the identity of the key associated with said selected range of coordinates to said utilizing means.

4. The sensor of claim 2 wherein each said electrode comprises:

at each intersection of a row and a column, a first electrode element connected to other first electrode elements in said row and a second electrode element connected to other second electrode elements in said column, and wherein said means for measuring a capacitance value for each electrode is adapted to measure the capacitance value for each row of said first electrode elements and the capacitance value for each column of said second electrode elements.

5. The sensor of claim 4 wherein said first and second electrode elements at each intersection are interdigitated.

6. The sensor of claim 1 wherein said calculating means periodically calculates changes in said centroid of capacitance position and said sending means periodically sends said changes to said utilizing means.

7. The sensor of claim 1 which further comprises:

means responsive to said measuring means for comparing said capacitance values with a second preset threshold and for indicating to said utilizing means when said second preset threshold is exceeded, said second preset threshold being set at a capacitance value higher than said first preset threshold.

8. The sensor of claim 1 wherein said measuring means comprises:

means connected to said electrodes for supplying the same RF signal in unison to each said electrode, means connected to said electrodes for sensing RF currents flowing between said electrodes and said object in response to said RF signal, and means connected to said RF current sensing means for converting said RF currents into signals representative of said capacitance values for each said electrode.

9. The sensor of claim 8, which further comprises:

a guard plane substantially parallel to said electrodes, and said means for supplying an RF signal further comprises:

means connected to said guard plane for supplying said RF signal to said guard plane in unison with the RF signals supplied to said electrodes.

10. A touch-sensitive input device for a computer, which comprises:

an array of electrodes on a surface of said input device, said electrodes being arranged in rows and columns;

an insulating layer covering said electrodes;

means connected to said electrodes for measuring a capacitance value for each said electrode;

means responsive to said measuring means for comparing said capacitance values with a first preset threshold and, if at least one of said capacitance values exceeds said first preset threshold, for calculating the coordinates of a centroid of capacitance for said array from said measured capacitance values, said centroid of capacitance corresponding to the position of a finger or other object touching said surface, said first preset threshold being set at a capacitance value that is exceeded for a given electrode only when said finger or other object is close to or touching said surface in the vicinity of said given electrode, said centroid of capacitance being the first moment of the distribution of said capacitance values in said array and representing substantially the position of said object in a continuous range of positions on said surface; and means responsive to said calculating means and connected to said computer for sending information to said computer indicative of or derived from said calculated coordinates.

\* \* \* \* \*